J. H. MOTT.
MANURE SPREADER.
APPLICATION FILED MAR. 26, 1917.
1,320,782.
Patented Nov. 4, 1919.
2 SHEETS—SHEET 2.
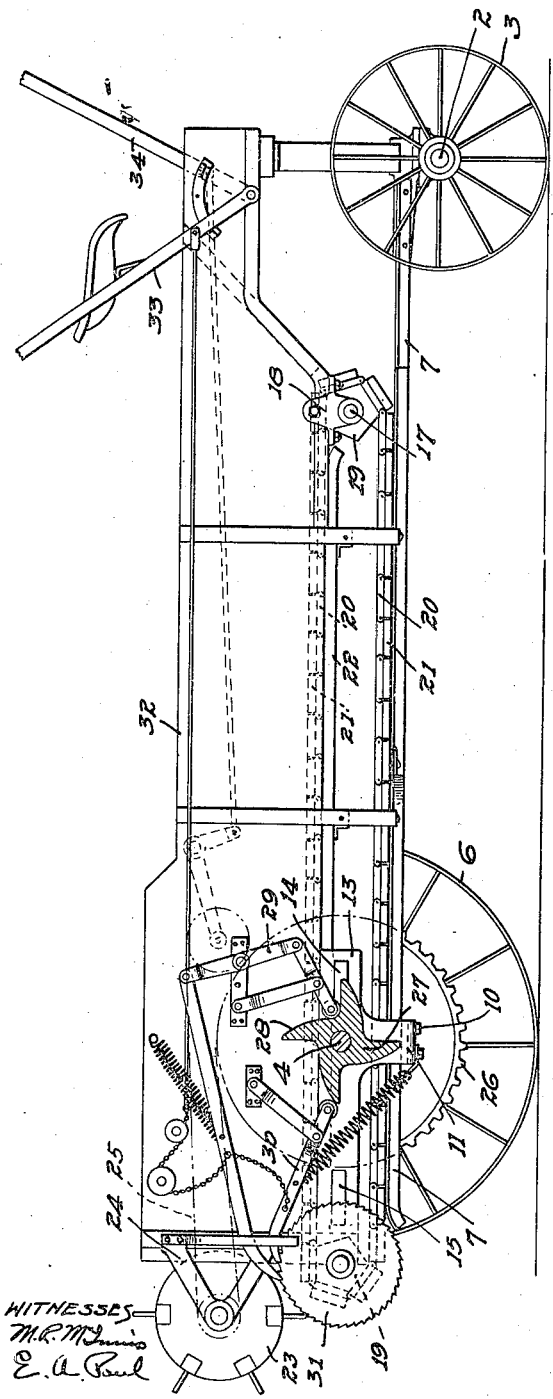
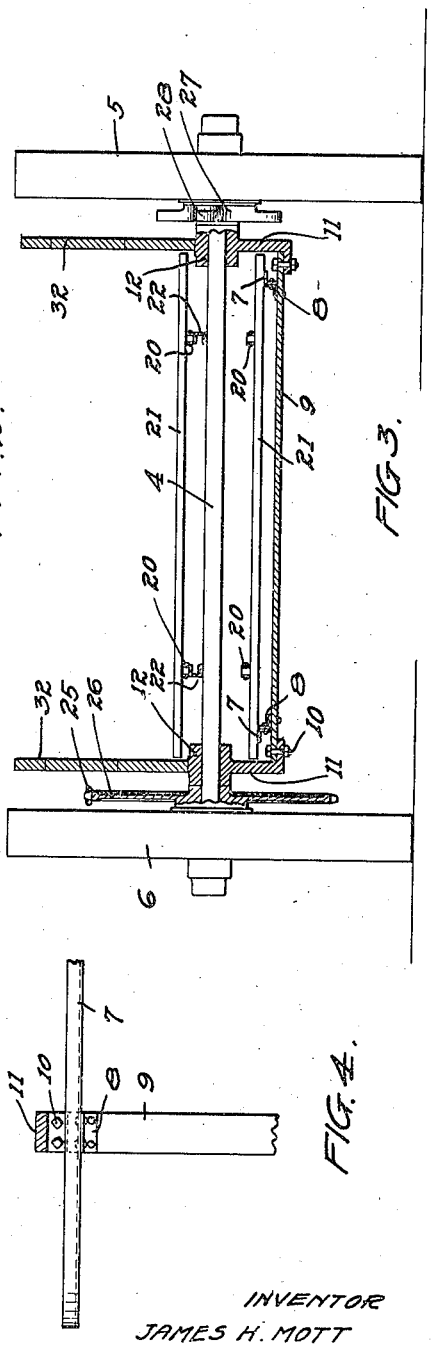
WITNESSES
M. R. McInnis
E. A. Paul
INVENTOR
JAMES H. MOTT
BY Paul & Paul
ATTORNEYS

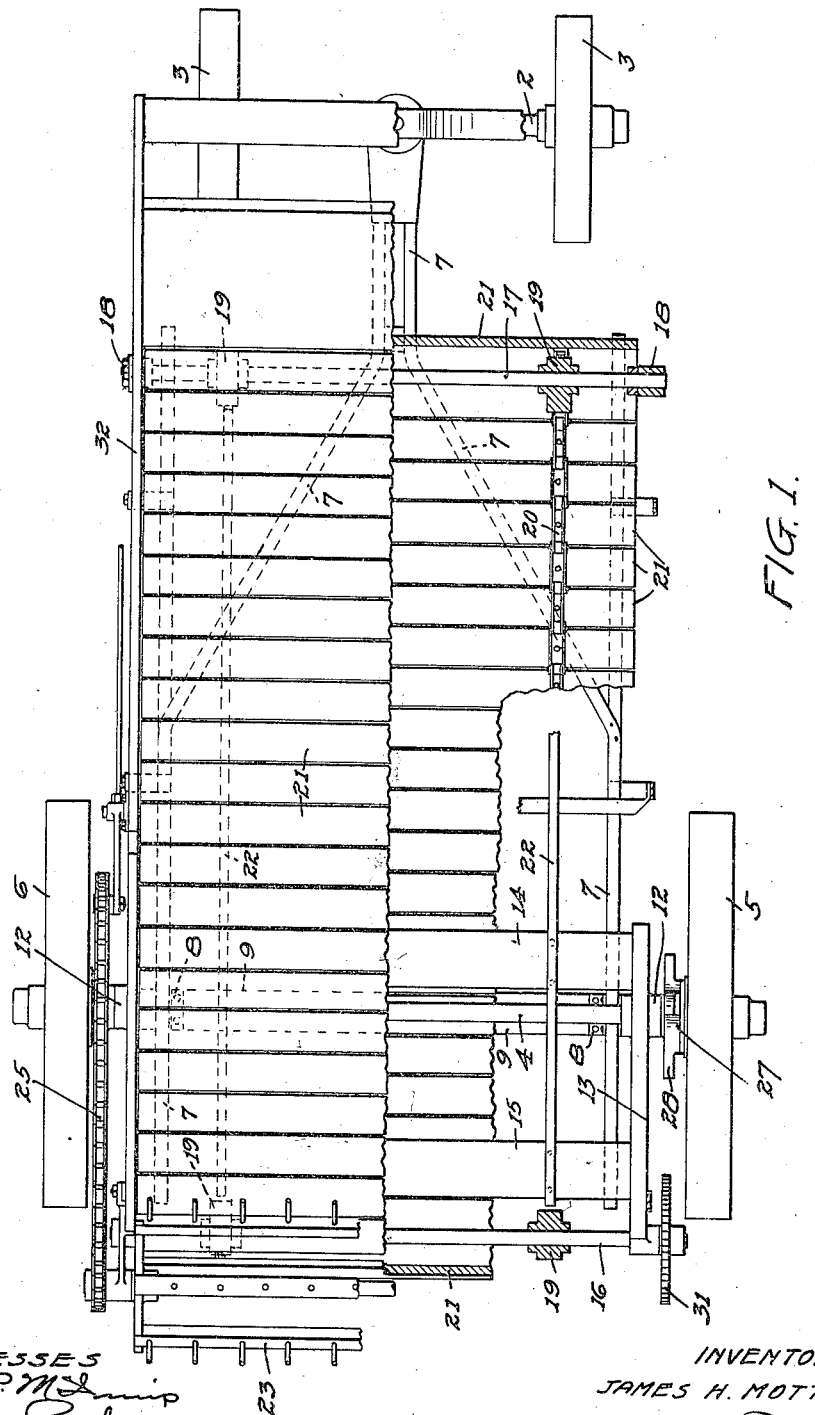

UNITED STATES PATENT OFFICE.

JAMES H. MOTT, OF MINNEAPOLIS, MINNESOTA.

MANURE-SPREADER.

1,320,782.  Specification of Letters Patent.  Patented Nov. 4, 1919.

Application filed March 26, 1917. Serial No. 157,372.

*To all whom it may concern:*

Be it known that I, JAMES H. MOTT, a citizen of the United States, resident of Minneapolis, county of Hennepin, State of Minnesota, have invented certain new and useful Improvements in Manure-Spreaders, of which the following is a specification.

The object of my invention is to provide a manure spreader of light draft and one which cannot become clogged in operation and is strong and durable.

A further object is to provide a manure spreader composed of but comparatively few parts and hence inexpensive to manufacture and maintain.

A further and particular object is to provide a manure spreader in which the draft is transmitted directly from the forward to the rear axles from which power is applied to operate the feeding and spreading mechanism of the machine.

The invention consists generally in various constructions and combinations, all as hereinafter described and particularly pointed out in the claims.

In the accompanying drawings forming part of this specification,

Figure 1 is a plan view of a manure spreader embodying my invention,

Fig. 2 is a side elevation, partially in section, of the same,

Fig. 3 is a transverse sectional view,

Fig. 4 is a detail sectional view of the cross bar connecting the apron supporting hangers to the rear of the machine and showing the apron guiding rail thereon.

In the drawing, 2 represents the forward axle having carrying wheels 3. 4 is the rear axle, having carrying wheels 5 and 6. Reaches 7 are connected at their forward ends to the axle 2 and extend backwardly therefrom and have diverging rear portions formed preferably of angle bar material and secured to angle bars 8 which are mounted on a cross bar 9 that is secured by bolts 10 or other suitable means to hangers 11 having hubs 12 in which the rear axle is journaled. The reaches converge at their forward ends and are united to a plate 7' which projects over the axle between it and the bolster 3' and has the usual pivotal connection (not shown) with the axle. Rails 13 are formed on said hubs, projecting forwardly and rearwardly therefrom and cross bars 14 and 15 are secured to said rails in the front and the rear respectively of the axle 4 and hold them in parallel relation. A shaft 16 is journaled in bearings in the rear ends of said rails. A shaft 17 is journaled in bearings in hangers 18 at the forward end of the wagon box and said shafts are provided with polygonal faced wheels 19 forming bearing surfaces for the links of chains 20 to which the apron slats 21 are secured. Suitable tracks 22 are provided above the rear axle and secured to the cross bars 14 and 15 and form supports for the upper section or run of the apron, while the lower run or section slides upon the rear ends of the reach bars, which are supported beneath the axle and have downwardly turned lower ends for convenience in receiving the apron as it makes the turn at the rear of the machine. With this arrangement the apron is low down, making it easier in loading and more convenient in discharging, while the reach bars serve the double purpose of transmitting the pull from the forward to the rear axle and also support the lower stretch or run of the apron, dispensing entirely with independent tracks frequently required for this purpose.

As set forth in the preamble of the specification, I provide a direct draft between the forward axle and the rear axle through the reach bars. This draft will be independent of the spreader box and bolster and I am able, therefore, to make the box of comparatively light material, with side walls sufficient only for holding the material on the feed belt. By this construction I not only make the machine lighter and less expensive to build, but by bringing the draft line nearer the ground I make it easier of operation.

A toothed cylinder or beater 23 is mounted on brackets 24 at the rear end of the machine and driven by a belt 25 from a gear 26 on the hub of one of the rear wheels. The other wheel has a toothed member 27 provided with cam surfaces 28 for operating lever devices 29 and 30 which control the movement of a ratchet feed 31 to which I make no claim in this application.

The machine is provided with the usual side walls 32, suitably supported to form with the apron a box into which the fertilizer is loaded, and at the forward end of the machine are levers 33 and 34 having suitable connections with the ratchet mechanism and with the means for controlling the cylinder drive belt 25. These are details of the apparatus to which I make no particular claim, my invention consisting primarily in the arrangement of the apron whereby the lower stretch or run thereof operates beneath the rear axle and above the reach bars. A cross bar 32' is provided at the forward end of the spreader box and is seated upon the bolster.

I claim as my invention:

1. A manure spreader, comprising front and rear wheel axles, a reach connecting the front and rear axles and composed of oppositely disposed spaced apart bars, the rear portion and the forward portion of said bars extending parallel with each other and the middle portion converging inwardly and forwardly between the rear and forward parallel portions, said bars lying in a substantially horizontal plane from the front to the rear axle and supported from the rear axle to leave a space between the axle and the bars, a body supported above said reach-bars, longitudinally extending rails supported in a higher horizontal plane than the reach-bars, and an endless traveling carrier in the body having its upper run supported by said longitudinally extending rails and its lower run supported by said reach-bars and passing between the rear axle and the reach-bars.

2. A manure spreader, comprising front and rear wheel axles, a reach connecting the front and rear axles and composed of oppositely disposed spaced apart bars lying in a substantially horizontal plane from the front to the rear axle, said bars at the rear axle being below and spaced apart from the axle, hubs carried by the rear axle and formed with hangers serving to support and connect the reach-bars to the axle, and also formed with rails projecting therefrom to opposite sides of the axle, cross bars disposed at the rear and to the front of the axle and connecting one of said rails to the other, longitudinally extending track-rails positioned above the rear axle and supported by said cross-bars, and an endless traveling carrier having its upper run supported by said longitudinally extending track-rails and its lower run by said reach-bars and passing between the rear axle and the reach-bars.

In witness whereof, I have hereunto set my hand this 22nd day of March, 1917.

JAMES H. MOTT.

Copies of this patent may be obtained for five cents each, by addressing the "Commissioner of Patents, Washington, D. C."